No. 799,715. PATENTED SEPT. 19, 1905.
P. F. CARROLL.
DOUGH BREAKER.
APPLICATION FILED JAN. 22, 1903.
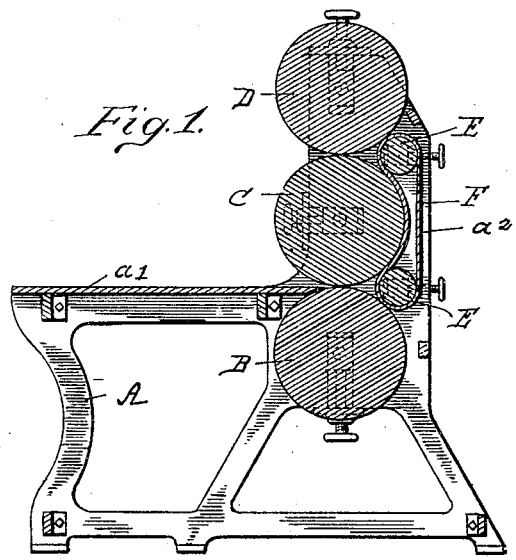
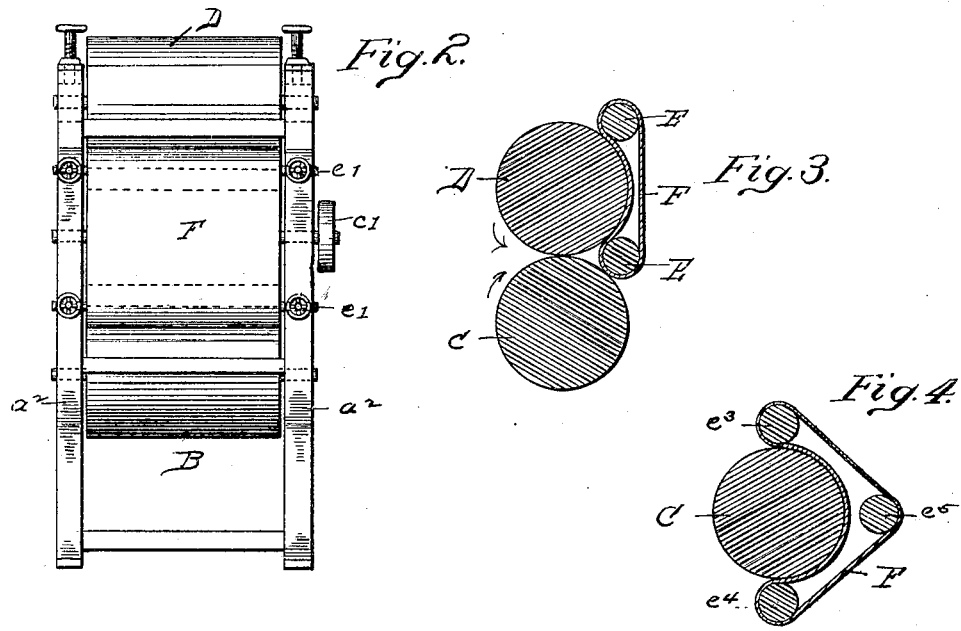
Witnesses:
L. G. Snoro.
H. Benjamin.
Inventor.
Philip F. Carroll,
by Frederick Benjamin,
Atty.

UNITED STATES PATENT OFFICE.

PHILIP F. CARROLL, OF JOLIET, ILLINOIS.

DOUGH-BREAKER.

No. 799,715.　　　　　Specification of Letters Patent.　　　　Patented Sept. 19, 1905.

Application filed January 22, 1903. Serial No. 140,182.

*To all whom it may concern:*

Be it known that I, PHILIP F. CARROLL, a citizen of the United States, residing at Joliet, in the county of Will and State of Illinois, have invented certain new and useful Improvements in Dough-Breakers, of which the following is a specification.

This invention relates to improvements in machines for breaking dough, the object of which is to especially prepare the dough for manufacture into crackers and like products.

In dough-breakers as now manufactured it is necessary to elevate the dough by hand and feed it between coacting rollers which compress the dough into a sheet and deliver onto a table, from which it is again lifted by the operator for repeated rollings. As the dough is in a large mass of considerable weight, the work of raising or lifting it to the rollers by hand is specially laborious; and the especial object of my invention is to lift the dough mechanically and present it to the rollers more evenly than can be done by hand.

In the accompanying drawings, which form a part of this application, I have illustrated a preferred embodiment of my invention in the following views.

Figure 1 is a transverse section taken through a machine, showing my improvements. Fig. 2 is a rear elevation of the same machine. Fig. 3 is a detail showing a modified form of arranging the compression-rollers and apron, and Fig. 4 is a detail of another form of arranging such elements.

Referring to the drawings in detail, A represents the machine-frame, which supports the operative parts and comprises a table $a'$, on which the dough is manipulated in connection with the rolling operations, and includes sides $a^2$, in which are suitable bearings for the spindles of the rollers to be described. Mounted in the lower part of the sides of the frame is a roller B, the spindles of which are adjustable in vertical planes on sliding bearings of any well-known type, as indicated by dotted lines in Fig. 1, the form of such bearings being a non-essential feature of this invention. Mounted directly over the roller B and in frictional contact therewith is a second roller C, the spindles of which turn in bearing-blocks which are adjustable in the frame on horizontal planes, also as indicated by dotted lines in Fig. 1. Superimposed on the roller C is a third roller D, the spindles of which turn in bearing-blocks which are adjustable on the frame in vertical planes. On the shaft of the roller C is fixed a drive-pulley $c'$, to which may be connected a drive-belt from any suitable power. It will be apparent that the bearings of the rollers described may be supported by springs in a manner well known in the art, so that they may yield as the dough passes therebetween.

At the rear of the rollers B C and with suitable bearings in the frame for their spindles $e'$ are two small rollers E E, the spindles of which are also supported in bearing-blocks which are adjustable on horizontal planes, so that they may be moved toward or away from the rollers B C. On these small rollers an endless belt, apron, or conveyer F is placed, with its outer surface in frictional contact with the roller C. This conveyer may be of cloth, felt, leather, or other suitable material of a yielding nature, which will cause it to give sufficiently to permit the dough to pass between it and the roller C or be carried with said belt from the point where it comes in contact with the dough to the upper side of the roller C, where the dough will be met by the upper roller D and drawn between said roller and C and thence be delivered to the table. It will be apparent that the frictional contact between the dough and the belt and the dough and the roller C will under the proper tension of the belt cause the belt to travel on its rollers, and thus aid in conveying the dough upward until it can be brought into frictional contact with the roller D. The tension of the belt is regulated by adjusting the bearings of their spindles in a manner well known in the art of bearing adjustment.

Instead of arranging the belt-rollers as shown in Fig. 1 I may with almost equally-effective results arrange them as shown in either Fig. 3 or Fig. 4. As shown in Fig. 3, I employ two compression-rollers C and D and arrange the belt as shown in Fig. 1 relative to the rollers B and C, the dough in this case being fed between said compression-rollers and carried by the belt over the upper side of the upper roller, where it can be grasped by the hands of the operator to be re-fed to the rollers as often as may be desired. In the modified arrangement shown in Fig. 4 I employ but one compression-roller, as C, and utilize three belt-rollers $e^3$, $e^4$, and $e^5$, the latter being the tension-roller and the first-named being placed, respectively, on the upper and lower sides of the compression-roller and themselves serving as compression-rollers as the dough is fed between them and the roller C by the action of the endless belt which travels over said rollers.

So far as I am aware I am the first to utilize an endless belt to convey, in coöperation with the compression-rollers, the dough between said rollers, and I therefore do not wish to be limited to any special arrangement or form of rollers or belt; but

What I claim as new, and desire to obtain by Letters Patent, is—

1. In a dough-breaker, a dough working and feed table, and a supporting-frame, compression-rollers mounted in a vertical plane, belt-rollers mounted at the rear of the compression-rollers, and adjustable relative thereto, an endless belt traveling on said belt-rollers in close proximity to one or more of the compression-rollers, and means for controlling the tension of the belt on its rollers.

2. In a dough-breaker, a series of compression-rollers arranged in a vertical plane substantially as shown, the upper and lower rollers adapted to be adjusted on vertical lines and the middle roller being horizontally adjustable, an endless belt arranged at the rear of the center roller and in loose contact therewith, and adjustable rollers carrying said belt, all of said rollers being mounted on a suitable frame comprising a dough-working table.

3. In a dough-breaker, a dough working and feed table, and a supporting-frame, compression-rollers adapted to have the dough fed therebetween from the table, an endless belt mounted to travel at the rear of one of said rollers and in close proximity thereto, said belt and roller adapted to raise the dough from the table by frictional contact and to deliver same to the upper side of said roller, substantially in the manner and for the purpose set forth.

4. In a dough-breaker, a dough working and feed table, and a supporting-frame, rollers adapted to have the dough fed therebetween from the table, said rollers being adjustable relative to each other, an endless belt mounted to travel at the rear of one of said rollers, in close proximity thereto and adjustable relative thereto, said belt and roller adapted to raise the dough from the table by frictional contact and to deliver same to the upper side of said roller, substantially in the manner and for the purpose set forth.

In testimony whereof I affix my signature in presence of two witnesses.

PHILIP F. CARROLL.

Witnesses:
F. BENJAMIN,
L. G. SNOW.